(12) United States Patent
Detienne et al.

(10) Patent No.: US 11,757,991 B2
(45) Date of Patent: Sep. 12, 2023

(54) COMMON SYNCHRONIZATION OF DEVICE COMMAND INTO MULTIPLE SYNCHRONIZED SINGLE DEVICE TASKS

(71) Applicant: Cisco Technology, Inc., San Jose, CA (US)

(72) Inventors: Frédéric René Philippe Detienne, Harze (BE); Piotr Jerzy Kupisiewicz, Cracow (PL); Alexandre Honoré, Schaerbeek (BE); Jonathan Maria Jan Slenders, Ghent (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/509,438

(22) Filed: Oct. 25, 2021

(65) Prior Publication Data
US 2023/0027999 A1    Jan. 26, 2023

Related U.S. Application Data

(60) Provisional application No. 63/224,541, filed on Jul. 22, 2021.

(51) Int. Cl.
*G06F 15/16* (2006.01)
*H04L 67/1095* (2022.01)
*H04L 41/22* (2022.01)

(52) U.S. Cl.
CPC .......... *H04L 67/1095* (2013.01); *H04L 41/22* (2013.01)

(58) Field of Classification Search
CPC .......................... H04L 67/1095; H04L 41/22
USPC ....................................................... 709/248
See application file for complete search history.

(56) References Cited

U.S. PATENT DOCUMENTS

| | | | | |
|---|---|---|---|---|
| 5,642,507 A | * | 6/1997 | Iwazaki | G06F 11/0712 718/107 |
| 6,128,642 A | * | 10/2000 | Doraswamy | G06F 9/505 709/224 |
| 6,145,001 A | * | 11/2000 | Scholl | H04L 41/0253 709/200 |

(Continued)

FOREIGN PATENT DOCUMENTS

| | | | | |
|---|---|---|---|---|
| CN | 106713487 A | | 5/2017 | |
| WO | WO-2014112207 A1 | * | 7/2014 | ......... G06K 9/00771 |

OTHER PUBLICATIONS

Source code for distributed.deploy.ssh, Dask, https://docs.dask.org/en/stable/_modules/distributed/deploy/ssh.html, retrieved Aug. 18, 2021, 7 pages.

*Primary Examiner* — Alicia Baturay
(74) *Attorney, Agent, or Firm* — Edell, Shapiro & Finnan, LLC (57) ABSTRACT

Methods are provided for synchronizing task execution and/or data collection on multiple network devices. The methods involve obtaining a command to be executed on a plurality of target network devices and splitting the command into a plurality of single device execution tasks. Each single device execution task is for a respective network device of the plurality of target network devices. The methods further involve providing each of the plurality of single device execution tasks, via a command line interface or an application programming interface, to a respective one of the plurality of target network devices. The plurality of single device execution tasks being provided within a bounded time interval.

20 Claims, 5 Drawing Sheets

(56) References Cited

U.S. PATENT DOCUMENTS

| | | | | |
|---|---|---|---|---|
| 6,389,464 | B1* | 5/2002 | Krishnamurthy | H04L 41/0253 709/221 |
| 6,532,491 | B1* | 3/2003 | Lakis | H04L 41/0213 709/224 |
| 7,028,030 | B2* | 4/2006 | Jacobs | H04L 67/288 |
| 7,155,459 | B2* | 12/2006 | Chaudhuri | G06F 16/22 |
| 7,406,511 | B2* | 7/2008 | Bock | H04L 9/40 707/999.009 |
| 7,444,333 | B2* | 10/2008 | Jacobs | G07F 19/201 |
| 7,458,077 | B2* | 11/2008 | Duke | G06F 9/4881 718/100 |
| 7,675,418 | B2* | 3/2010 | Agarwal | G06Q 10/087 340/572.1 |
| 8,347,289 | B2* | 1/2013 | Diao | G06F 11/3419 702/182 |
| 8,438,491 | B2* | 5/2013 | Land | H04L 41/0253 715/748 |
| 8,533,302 | B2* | 9/2013 | Lopes | G06F 9/546 709/227 |
| 8,615,773 | B2* | 12/2013 | Bishop | G06F 9/542 719/318 |
| 9,015,290 | B2* | 4/2015 | Lopes | G06F 9/44505 709/224 |
| 9,015,291 | B2* | 4/2015 | Lopes | G06F 9/546 709/221 |
| 9,037,657 | B2* | 5/2015 | Nieh | H04L 67/104 709/204 |
| 9,648,066 | B2* | 5/2017 | Cheung | H04L 65/401 |
| 10,645,016 | B2* | 5/2020 | Briscoe | H04L 47/193 |
| 10,820,273 | B2* | 10/2020 | Zhao | H04L 67/14 |
| 10,986,213 | B2* | 4/2021 | Venkataswami | G06F 16/1744 |
| 11,140,029 | B1* | 10/2021 | Singhal | H04L 41/0895 |
| 11,216,293 | B2* | 1/2022 | Andrews | G06F 9/45508 |
| 11,252,246 | B1* | 2/2022 | Engelhart | H04M 15/73 |
| 11,290,330 | B1* | 3/2022 | Kothuri | H04L 41/082 |
| 11,471,777 | B1* | 10/2022 | Roberts | A63F 13/335 |
| 11,509,946 | B1* | 11/2022 | Liu | H04L 65/70 |
| 11,513,826 | B2* | 11/2022 | Detienne | G06F 9/45512 |
| 11,570,218 | B1* | 1/2023 | Roberts | H04L 65/80 |
| 11,589,129 | B1* | 2/2023 | Panchaksharaiah | H04N 21/2402 |
| 11,606,597 | B2* | 3/2023 | Iyer | H04N 21/2387 |
| 11,607,617 | B1* | 3/2023 | Roberts | A63F 13/86 |
| 11,632,531 | B1* | 4/2023 | Bryan | H04N 21/2187 348/43 |
| 2008/0005286 | A1* | 1/2008 | Short | H04L 41/0803 709/220 |
| 2011/0093619 | A1 | 4/2011 | Nelson | |
| 2013/0275625 | A1 | 10/2013 | Taivalsaari et al. | |
| 2015/0304417 | A1 | 10/2015 | Tan | |
| 2017/0180474 | A1 | 6/2017 | Ding et al. | |
| 2022/0132214 | A1* | 4/2022 | Felman | H04L 67/535 |
| 2022/0368743 | A1* | 11/2022 | Miller | H04L 65/611 |
| 2022/0385701 | A1* | 12/2022 | Wang | H04L 65/4015 |

* cited by examiner

COMMON SYNCHRONIZATION OF DEVICE COMMAND INTO MULTIPLE SYNCHRONIZED SINGLE DEVICE TASKS

CROSS REFERENCE TO RELATED APPLICATION

This application claims priority to U.S. Provisional Application No. 63/224,541, filed Jul. 22, 2021, the entirety of which is incorporated herein by reference.

TECHNICAL FIELD

The present disclosure relates to computer networking.

BACKGROUND

For certain applications, specifically for troubleshooting, data is collected from a set of collection points (e.g., network devices) in real-time. The collection points are individually managed without any synchronization mechanisms. The data collected may be different on various collection points. For example, some collection points may have a routing table, while others may have a Media Access Control (MAC) table. Further, the data may be obtained through different mechanisms. Some collection points may communicate using Secure Shell (SSH), while others may use Representational State Transfer (REST), or Netconf Application Programming Interface (API).

DESCRIPTION OF EXAMPLE EMBODIMENTS

Overview

Briefly, methods are presented for providing a synchronization mechanism that allows for synchronous data collection and/or task execution on multiple network devices, as may be required by a command.

In these methods, a computing device (such as a configuration server) obtains a command to be executed on a plurality of target network devices. The computing device splits the command into a plurality of single device execution tasks. Each single device execution task is for a respective network device of the plurality of target network devices. The methods further involve providing each of the plurality of single device tasks, via a command line interface (CLI) or an application programming interface (API), to a respective one of the plurality of target network devices. The plurality of single device execution tasks are provided to the respective target network devices within a bounded time interval.

Example Embodiments

When data is sequentially collected from multiple network devices, network nodes, or collection points, used interchangeable herein, with no effort to make the collection simultaneous or synchronous, the net result is a data set that is captured at different points in time. This net result is inconsistent data that needs to be intelligently interpreted. To interpret this net result is timely and error prone because human expertise and experience are required. Moreover, it takes human resources away from the actual problem resolution (signal/noise ratio) and prevents automation.

In one or more example embodiments, techniques are provided for collecting data or performing troubleshooting tasks on multiple network devices at substantially the same time or simultaneously. The techniques synchronize data collection from multiple different network devices that may be using different communication channels. The data set then represents data that is captured at substantially the same time or simultaneously. The techniques allow for task execution and/or data collection within a bounded time interval (at substantially same time and/or simultaneously) as may be required by a troubleshooting command. The techniques further provide a simultaneous multi-channel distribution of single device execution tasks to multiple network devices.

In one or more example embodiments, simultaneously means providing execution tasks to the target network devices within a specified, guaranteed, bounded interval, for example, the time interval between the earliest and latest message may not exceed one millisecond (ms). In other words, the execution tasks are dispatched to the target network devices within the bounded time interval, thereby allowing for substantially simultaneous execution of the tasks on the target network devices. If data such as telemetry data is collected from the network devices as a result of the execution task, this data is collected from various network devices at substantially same time. Since the telemetry data is collected at substantially same point in time from multiple network devices, troubleshooting and analysis are simplified.

Figure 1:
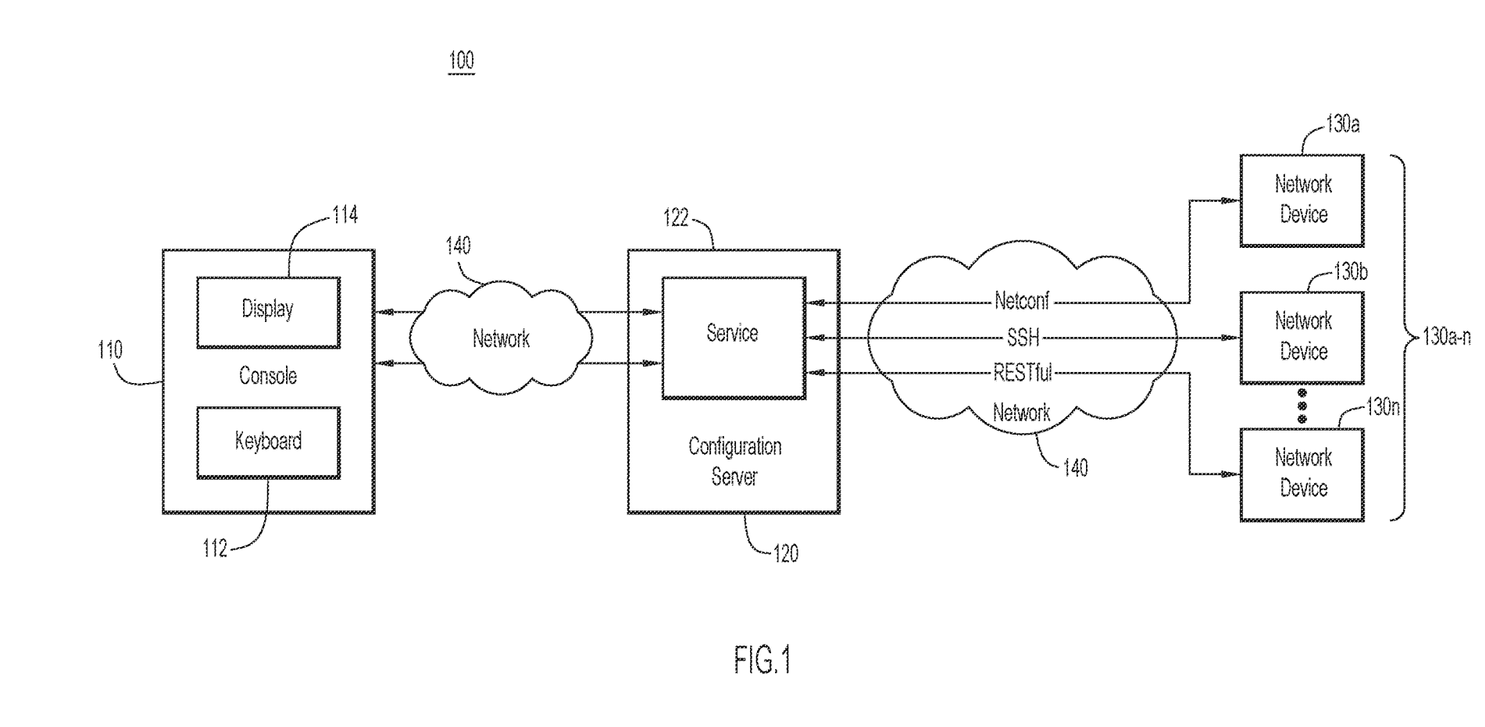
FIG. 1 is a block diagram illustrating a system in which data collection from network devices is synchronized, according to an example embodiment.

FIG. 1 is a block diagram depicting a system 100 in which data collection from multiple network devices is synchronized, according to an example embodiment. The system 100 includes a number of entities and one or more networks 140. The entities include a console 110, a configuration server 120, and network devices 130*a-n*. The notation "a-n" denotes that a number is not limited, can vary widely, and depends on a particular use case scenario.

The entities (nodes, collection points, network devices, computing devices, etc.) of the system 100 communicate via the one or more networks 140. The one or more networks 140 may include a local area network (LAN), a wide area network (WAN) such as the Internet, or a combination thereof, and includes wired, wireless, or fiber optic connections. In general, the one or more networks 140 can use any combination of connections and protocols that support communications between the entities of the system 100.

In various example embodiments, the entities of the system 100 (the console 110, the configuration server 120, and the network devices 130*a-n*) may each include a network interface, at least one processor, and a memory. Each entity may be any programmable electronic device capable of executing computer readable program instructions. The network interface may include one or more network interface cards that enable components of the entity to send and receive data over the one or more networks 140. Each entity may include internal and external hardware components such as those depicted and described in further detail in FIG. 5.

In one example embodiment, one or more entities of the system 100 may be deployed in a cloud with its functionality distributed over a number of hardware devices. For example, while a synchronization service (service) 122 is depicted as running on the configuration server 120, the service 122 may be deployed in a cloud i.e., deployed using multiple servers.

In one example embodiment, the console 110 is a computer device or a client device. The console 110 includes a user interface (e.g., a keyboard 112) configured to obtain a command input from an operator and configured to provide command output to the operator (e.g., via a display 114). The console 110 communicates with and configures one or more of the network devices 130a-n (collection points), via the service 122, using an SSH connection, for example. The console 110 requests data and/or action(s) from the network devices 130a-n by providing commands and obtaining data or results from these network devices 130a-n as data output or telemetry data.

The console 110 may generate a script or a playbook, which is an automated process for deploying a method of procedure (e.g., executing, on specific devices, the operations to configure or obtain various data such as configuration parameters, telemetry data, and so on from the specific devices).

The configuration server 120 may be a controller that hosts the service 122 for configuring and managing the network devices 130a-n. The service 122 may include one or more modules or units to perform various functions of the embodiments described below. The service 122 may be implemented by any combination of any quantity of software (and/or hardware modules or units), and may reside within memory of the configuration server 120 for execution by a processor.

The service 122 may enable a user, such as a network operator, to add, remove, and edit methods or procedures, which include operations that can be executed on the network devices 130a-n to perform maintenance, change configurations, gather telemetry data, or troubleshoot. The service 122 may transmit operations to the network devices 130a-n for execution and may collect information about the network devices 130a-n. When the service 122 receives instructions from an operator (e.g., via the console 110), the instructions (commands) may be transmitted to one or more devices (e.g., the network devices 130a-n) and executed locally on these network devices 130a-n within a bounded time interval. The net results or data output from executing these instructions are then provided to the console 110 via the service 122.

In one example embodiment, the service 122 obtains instructions such as a script from the console 110, splits the instructions into multiple single device execution tasks such as CLI commands or API calls depending on a configuration of a respective network device, and prepares a communication channel or establishes a connection to each network device that needs to execute the single device execution task. Only when the connection is established with every network device that needs to execute the instructions, the service 122 dispatches the single device execution task to these network devices. The single device execution tasks are dispatched to all of the network devices 130a-n within a bounded time interval or at substantially the same time, thereby providing for synchronous or substantially simultaneous execution of the troubleshooting tasks and/or data collection (telemetry, parameters, etc.) from multiple network devices.

While only one service 122 is depicted in FIG. 1, the number of services may depend on a particular configuration of the system 100. For example, there may be multiple services (multiple configuration servers or network controllers), each connected to a respective set of the network devices 130a-n. According to one or more example embodiments, the console 110 and the service 122 may be integrated into a single computing device such as the configuration server 120 or a network controller. The service 122 may be provided by a network management system and/or an analytics platform.

The network devices 130a-n may include line cards or stand-alone instances of one or more of switches, routers, gateways, repeaters, access points, traffic classifiers, firewalls, intrusion detectors, and the like. The network devices 130a-n are configured to transmit data traffic to and from various user devices and/or servers (not shown). The network devices 130a-n may communicate using different communication protocols. For example, a first network device 130a may connect with the service 122 using Netconf API or CLI, while a second network device 130b may communicate using SSH protocol, and an nth network device 130n may communicate using REST protocol.

The system 100 is a non-limiting example of a deployment environment for the service 122. The service 122 may be deployed in various other systems.

Figure 2:
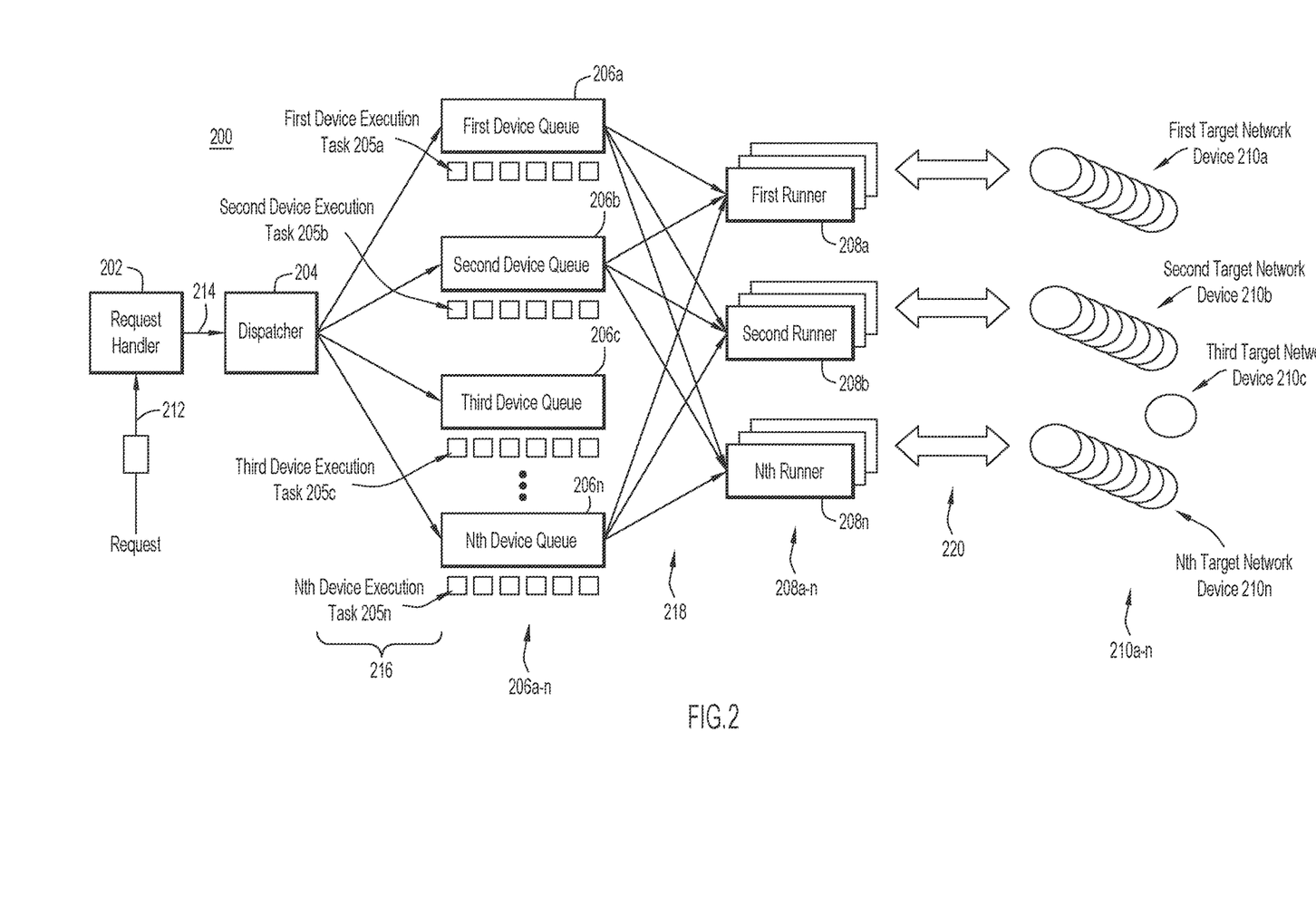
FIG. 2 is a flow diagram illustrating a method of performing one or more single device execution tasks on target network devices, according to an example embodiment.

FIG. 2 is a flow diagram illustrating a method 200 of performing one or more execution tasks on target network devices, according to an example embodiment. In one example, the service 122 performs the method 200.

The method 200 involves a request handler 202, a dispatcher 204, device queues 206a-n, executors (runners) 208a-n, and target network devices 210a-n. The target network devices 210a-n may be a subset of the network devices 130a-n and are identified in a command for performing one or more execution tasks.

The request handler 202 is a communication interface configured to communicate with one or more external entities such as client applications hosted on the console 110 and/or network operators. The request handler obtains and process messages from various external entities.

The dispatcher 204 is configured to split a command into a number of single device execution tasks. The dispatcher 204 generates a single device execution task for each target network device identified in the command. The dispatcher then dispatches the single device execution tasks 205a-n to the respective device queues 206a-n.

The device queues 206a-n are responsible for storing single device execution tasks 205a-n. Specifically, there is one device queue for each network device i.e., the device queue is dedicated to a specific network device. For example, the first device queue 206a stores a first single device execution task 205a for a first target network device 210a. The second device queue 206b stores a second single device execution task 205b for a second target network device 210b; the third device queue 206c stores a third single device execution task 205c for a third target network device 210c, . . . , and the nth device queue 206n stores the nth single device execution task 205n for the nth target network device 210n. Each of the device queues 206a-n may store a number of single device execution tasks for the respective target network device. Each new single device execution task is placed at the end of the respective device queue and is dispatched to the respective target network device using the runners 208a-n, when it reaches the front of the queue.

The runners 208a-n are configured to establish a communication channel with the respective target network devices 210a-n. The runners 208a-n provide the single device execution tasks from the front of the respective queue 206a-n to the respective target network devices 210a-n, via the established communication channel. There is one runner per target network device. In one example embodiment, the runners 208a-n establish and maintain protocol-specific (Netconf, REST, SSH, etc.) sessions with the target network devices 210a-n. For example, a first runner 208a establishes a first communication channel with a first target network device 210a using protocol 1 such as Netconf. A second runner 208b establishes a second communication channel with a second target network device 210b using protocol 2 such as REST API, and the nth runner 208n establishes another communication channel with the nth target network device 210n using protocol 3 such as SSH.

The method 200 involves at 212, the request handler 202 receiving a message or a command from a client application executing on the console 110. As an example, the messages may include a request to execute an SSH command or an API call on a list of network devices (the target network devices 210a-n). The request handler 202 parses or processes the message to extract the execution command and the target network devices 210a-n.

In one example embodiment, the request is initiated by an operator via a client application to execute API calls such as Netconf/YANG, Restful, etc. on a list of the target network devices 210a-n. The request may be generated by a playbook being executed on the console 110. The request may result in operational data output being generated by the target network devices 210a-n. For example, the operational data output may include network telemetry data, network load, etc. The request may activate one or more debug modes, kill one or more processes being executed on the target network devices 210a-n, and/or activate network data flow monitoring, etc.

In an example embodiment, the request is a synchronized request. The synchronized request aims to obtain substantially simultaneous execution of the command on all of the target network devices 210a-n. To this end, the synchronized request indicates that the request it to be executed within a set bounded time interval. The synchronized request may further specify the time interval such as dispatch the single device execution task to each of the target network devices 210a-n simultaneously or at substantially same time i.e., within a time interval of approximately one millisecond (ms).

Specifically, the request includes: (a) a list of the target network devices 210a-n that need to execute the command, (b) a list of API+parameters (or CLI's) to be executed and/or collected from each of the target network devices 210a-n, (c) an execution timeout, and (d) a synchronization strategy such as not important, best effort, or a bounded time interval. Optionally, the bounded time interval itself may be specified such as one to two milliseconds.

At 214, the information from the request is transmitted to the dispatcher 204. The dispatcher 204 selects the target network devices 210a-n based on this information and splits the command into a plurality of individual or single device execution tasks 205a-n. In other words, the dispatcher 204 generates instructions to perform a particular task or collect output data specific to each of the target network devices 210a-n.

At 216, the dispatcher 204 stores the single device execution tasks 205a-n into the respective device queues 206a-n.

At 218, the device queues 206a-n dispatch the single device execution tasks 205a-n from the front end of the queue to a pool of runners 208a-n. In one example embodiment, the runners 208a-n retrieve the single device execution tasks 205a-n from the front end of the device queues 206a-n after establishing a connection with each of the target network devices 210a-n.

At 220, the runners 208a-n obtain respective single device execution tasks 205a-n from the device queues 206a-n and provide them to the target network devices 210a-n. The target network devices 210a-n execute the single device execution tasks 205a-n, respectively, and provide the results (if any) to the runners 208a-n. The results may include data output such as operational data, network telemetry data, status of the execution, etc. The results are collected and returned to the requester such as an external entity in a form of data output. The processing of a synchronized request is explained in further detail with reference to FIG. 3.

Figure 3:
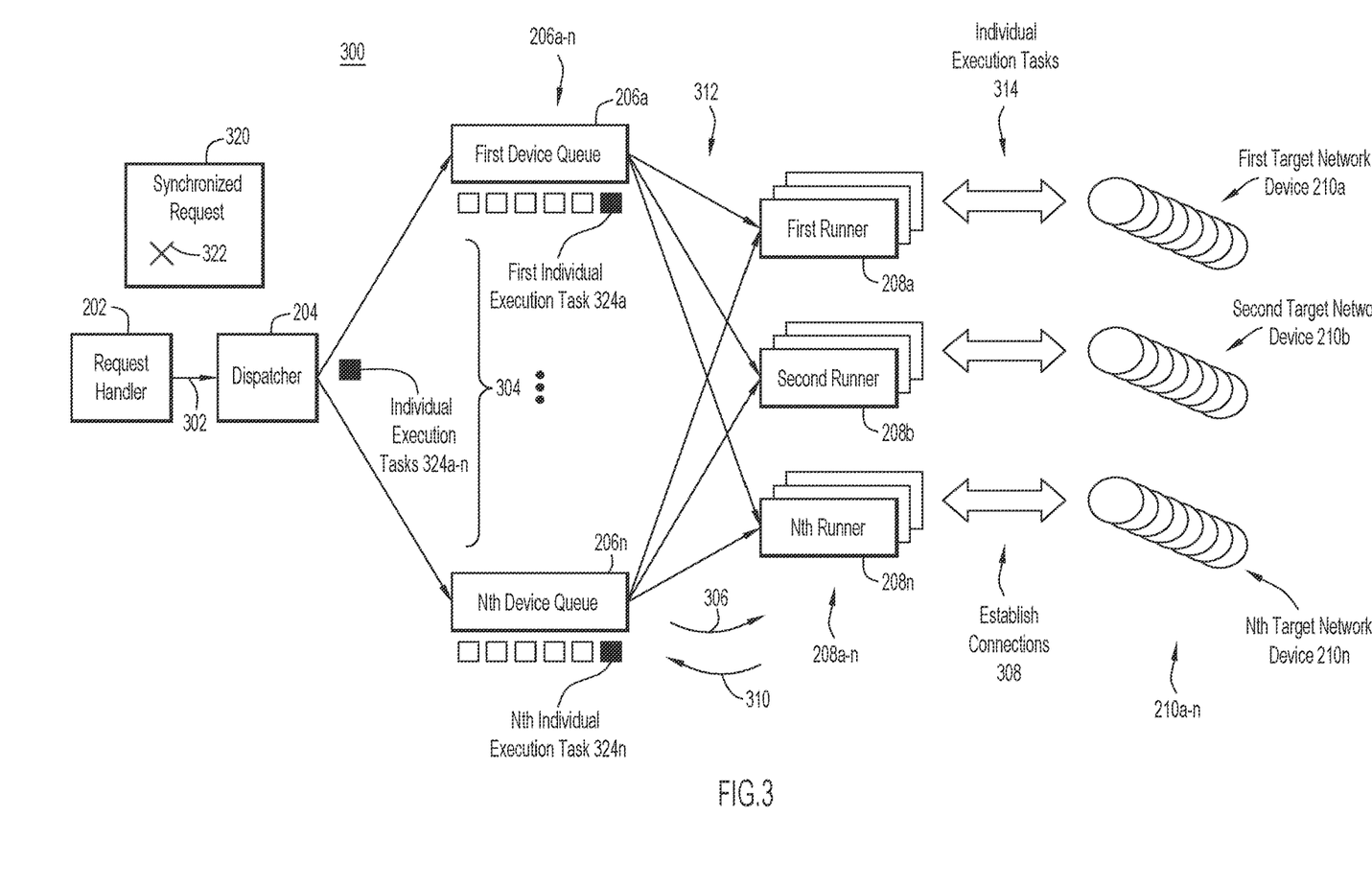
FIG. 3 is a flow diagram illustrating a method of performing one or more single device execution tasks on the target network devices within a bounded time interval, according to an example embodiment.

FIG. 3 is a flow diagram illustrating a method 300 of performing one or more single device execution tasks on the target network devices within a bounded time interval, according to an example embodiment. The method 300 is executed by the service 122 that is running on the configuration server 120 or in a cloud. Reference is also made to FIG. 2 for purposes of the description of FIG. 3.

At 302, the request handler 202 provides a synchronized request 320 to the dispatcher 204. The synchronized request 320 is similar to the regular request in that it is a demand for execution on a list of target network devices 210a-n. The synchronized request 320, however, further includes a marker 322 that identifies the request as synchronized. As such, the synchronized request 320 stands out from other requests. The marker 322 may be in a form of a Boolean, a bit in bit field, etc. For example, the synchronized request 320 includes an execution timeout and a synchronization strategy indicated as a bounded time interval. The synchronized request 320 is obtained by the request handler 202 and is passed onto the dispatcher 204.

At 304, the dispatcher 204 sends a copy of the request (individual execution tasks 324a-n) to each of the device queues 206a-n. The individual execution tasks 324a-n proceed to the end of each of the device queues 206a-n. Each of the individual execution tasks 324a-n include one or more commands that are to be executed by the respective one of the target network devices 210a-n. For example, a first individual execution task 324a may include CLI commands to kill a process A running on the first target network device 210a, to enable flow monitoring, and/or to collect telemetry data. When the first individual execution task 324a reaches the front end of the first device queue 206a, the first device queue 206a halts and waits for the remaining ones (324b-n) of the individual execution tasks 324a-n to reach the front end of the remaining ones of the device queues (206b-n). No other individual execution tasks are sent by the first device queue 206a to the first runner 208a until the remaining ones (206b-n) of the device queues 206a-n are ready to dispatch the individual execution tasks 324b-n to the runners 208b-n.

At 306, the device queues 206a-n notify the runners 208a-n to prepare connections to the target network devices 210a-n. In another example embodiment, another entity such as the dispatcher 204 or a control entity (not shown)

notifies the runners 208a-n that a connection needs to be established with the target network devices 210a-n.

At 308, the runners 208a-n establish a communication channel to each respective one of the target network devices 210a-n. In one example embodiment, the runners 208a-n prepare a respective connection by establishing a protocol channel (e.g., Transmission Control Protocol (TCP)), the crypto session (e.g., Transport Layer Security (TLS)), authentication, and so on. The runners 208a-n establish different types of communication channels using various protocols. The communication channel is considered ready when a single device execution task can be transmitted over this communication channel. If necessary, additional runners are instantiated to offer the requested level of simultaneity. In one example, one runner per target network device per protocol type may be spawned.

When all the target network devices connections are ready, at 310, the runners 208a-n notify the device queues 206a-n that they are ready to execute the individual execution tasks 324a-n.

At 312, the device queues 206a-n dispatch the individual execution tasks 324a-n to the runners 208a-n at substantially same time, simultaneously, and/or within a bounded time interval e.g. approximately 1 ms. The device queues 206a-n dispatch the individual execution tasks 324a-n in response to the individual executions tasks 324a-n reaching the front end of the respective device queues 206a-n and in response to the runners 208a-n establishing the respective communication connections. If one of the communication connections is not established or if one of the individual execution tasks 324a-n did not yet reach the front end of the respective one of the device queues 206a-n, the remaining ones of the device queues 206a-n halt and wait. In particular, a first individual execution task 324a is at the front of the first device queue 206a and an nth individual execution task 324n is also at the front of the nth device queue 206n. At substantially same time, the first individual execution task 324a is dispatched to a second runner 208b and the nth individual execution task 324n is dispatched to a first runner 208a.

At 314, the runners 208a-n provide the individual execution tasks 324a-n to the target network devices 210a-n via the established communication channels. If applicable, the results (data output) are collected and provided as data output.

The techniques presented above allow for task execution and data collection within a bounded time interval (at substantially same time and/or synchronously) as may be required by a troubleshooting command. A synchronized command indicates that the single device execution task needs to be executed by multiple target network devices at substantially same time. The techniques split the synchronized command into multiple single device execution tasks (each for a respective network device), prepare a respective communication channel for each of the target network devices 210a-n. When the connections are ready and the individual execution tasks reached the front end of the device queues 206a-n, the runners 208a-n provide these individual execution tasks, via a command line interface (CLI) or an application programming interface (API), to a respective one of the plurality of target network devices 210a-n. The plurality of individual execution tasks are provided within a bounded time interval. The techniques allow for synchronous execution of tasks such as data collection or troubleshooting on multiple network devices 210a-n.

Figure 4:
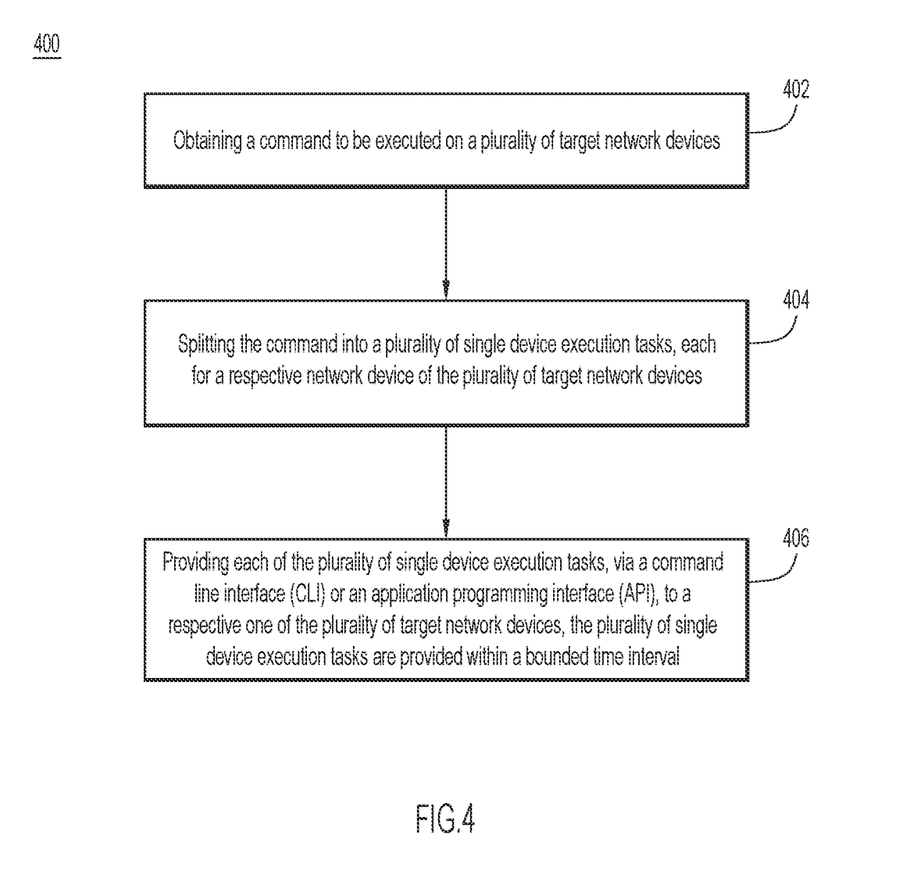
FIG. 4 is a flow diagram illustrating a method of providing single device execution tasks to the target network devices within a bounded time interval, according to an example embodiment.

FIG. 4 is a flow diagram illustrating a method 400 of providing single device execution tasks to the target network devices within a bounded time interval, according to an example embodiment. The method 400 is performed by a computing device such as the configuration server 120.

At 402, the method 400 involves obtaining a command to be executed on a plurality of target network devices.

At 404, the method 400 involves splitting the command into a plurality of single device execution tasks. Each single device execution task is for a respective network device of the plurality of target network devices.

At 406, the method 400 involves providing each of the plurality of single device execution tasks, via a command line interface (CLI) or an application programming interface (API), to a respective one of the plurality of target network devices. The plurality of single device execution tasks are provided within a bounded time interval.

In one or more example embodiments, the method 400 may further involve establishing a communication channel to each of the plurality of target network devices. At least one communication channel may be established using a different protocol than used on another communication channel.

In one form, the method 400 may further involve halting providing one of the plurality of single device execution tasks until the communication channel is established with each of the plurality of target network devices.

In one instance, the command may include a plurality of parameters that are to be collected by the plurality of target network devices. The method 400 may further involve obtaining the plurality of parameters that are output by the plurality of target network devices. The plurality of parameters may be generated by the plurality of target network devices performing the plurality of single device execution tasks substantially simultaneously.

According to one or more example embodiments, the operation 402 of obtaining the command to be executed on the plurality of target network devices may include obtaining, from a client device, a request including a list of the plurality of target network devices that are to execute the command and an execution timeout that defines the bounded time interval.

In another instance, the command may include a marker indicating that execution is to be synchronized among the plurality of target network devices. The method 400 may further involve storing the plurality of single device execution tasks into a plurality of device queues such that each of the plurality of device queues is dedicated to a respective network device from the plurality of target network devices.

According to one or more example embodiments, the plurality of single device execution tasks may be placed at an end of the plurality of device queues. The method 400 may further involve, based on detecting that a first single device execution task from the plurality of single device execution tasks reached a front of a first device queue among the plurality of device queues, halting providing, to a first network device from the plurality of target network devices, the first single device execution task until remaining ones of the plurality of single device execution tasks reach a front of remaining ones of the plurality of device queues.

In one form, the operation 406 of providing each of the plurality of single device execution tasks may include substantially simultaneously dispatching the plurality of single device execution tasks to the plurality of target network devices.

Figure 5:
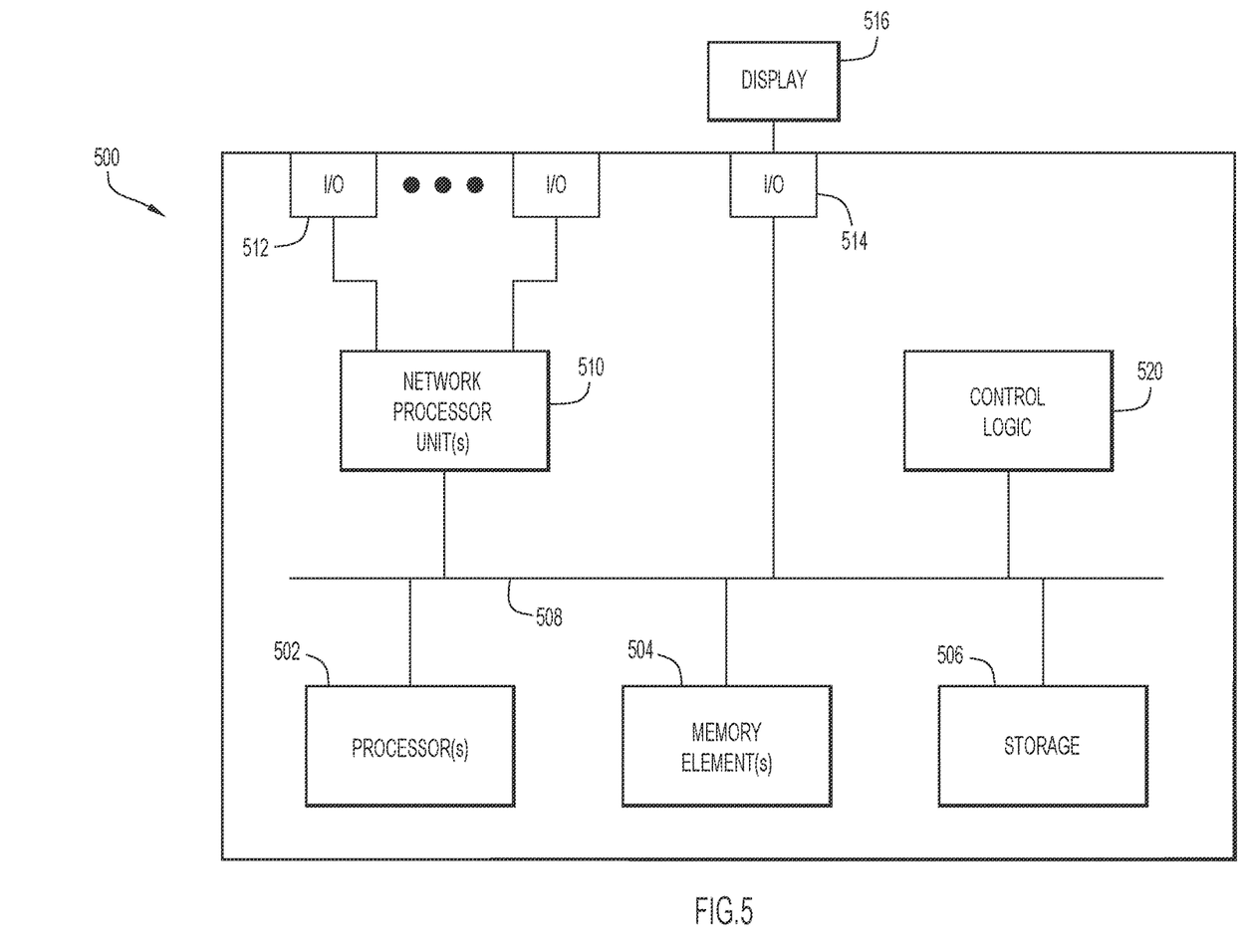
FIG. 5 is a hardware block diagram of a computing device that may perform functions associated with any combination of operations in connection with the techniques depicted and described in FIGS. 1-4, according to various example embodiments.

FIG. 5 is a hardware block diagram of a computing device 500 that may perform functions associated with any combination of operations in connection with the techniques depicted in FIGS. 1-4, according to various example embodiments, including, but not limited to, operations of the console 110, the service 122 of FIG. 1. Further, the computing device 500 may be representative of one of the network devices 130a-n of FIG. 1 or the target network device 210a of FIGS. 2 and 3. It should be appreciated that FIG. 5 provides only an illustration of one embodiment and does not imply any limitations with regard to the environments in which different embodiments may be implemented. Many modifications to the depicted environment may be made.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with one or more memory elements 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 516, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as the configuration server 120 of FIG. 1. The apparatus includes a memory, a network interface configured to enable network communications and a processor. The processor is configured to perform operations which include obtaining a command to be executed on a plurality of target network devices and splitting the command into a plurality of single device execution tasks. Each of the plurality of single device execution tasks is for a respective network device of the plurality of target network devices. The operations further include providing each of the plurality of single device execution tasks, via a command line interface or an application programming interface, to a respective one of the plurality of target network devices. The plurality of single device execution tasks are provided within a bounded time interval.

In yet another example embodiment, one or more non-transitory computer readable storage media encoded with instructions are provided. When the media is executed by a processor, the instructions cause the processor to execute a method which involves obtaining a command to be executed on a plurality of target network devices and splitting the command into a plurality of single device execution tasks. Each of the plurality of single device execution tasks is for a respective network device of the plurality of target network devices. The method further involves providing each of the plurality of single device execution tasks, via a command line interface or an application programming interface, to a respective one of the plurality of target network devices. The plurality of single device execution tasks are provided within a bounded time interval.

In yet another example embodiment, a system is provided that includes the devices and operations explained above with reference to FIGS. 1-5.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory elements(s) 504 can store data, software, code, instructions (e.g., processor instructions), logic, parameters, combinations thereof, and/or the like used for operations described herein. This includes the storage 506 and/or memory elements(s) 504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining a command to be executed on a plurality of target network devices, wherein the command includes a synchronization strategy indicating whether the command is to be executed within a bounded time interval on the plurality of target network devices;
    splitting the command into a plurality of single device execution tasks, each for a respective network device of the plurality of target network devices; and
    providing each of the plurality of single device execution tasks, via a command line interface or an application programming interface, to a respective one of the plurality of target network devices, the plurality of single device execution tasks being provided within the bounded time interval.

2. The method of claim 1, further comprising:
    establishing a communication channel to each of the plurality of target network devices, wherein at least one communication channel is established using a different protocol than used on another communication channel.

3. The method of claim 2, further comprising:
    halting providing one of the plurality of single device execution tasks until the communication channel is established with each of the plurality of target network devices.

4. The method of claim 1, wherein the command includes a plurality of parameters that are to be collected by the plurality of target network devices, and further comprising:
    obtaining the plurality of parameters that are output by the plurality of target network devices, the plurality of parameters being generated by the plurality of target network devices performing the plurality of single device execution tasks substantially simultaneously.

5. The method of claim 1, wherein obtaining the command to be executed on the plurality of target network devices includes:
    obtaining, from a client device, a request comprising a list of the plurality of target network devices that are to execute the command and an execution timeout that defines the bounded time interval.

6. The method of claim 1, wherein the synchronization strategy indicates that the command is to be executed within the bounded time interval of approximately two milliseconds on the plurality of target network devices.

7. The method of claim 1, wherein the command is a synchronized request and further comprising:
    establishing a plurality of communication channels to the plurality of target network devices,
    wherein each of the plurality of single device execution tasks is provided after the plurality of communication channels are established.

8. The method of claim 1, further comprising:
    halting providing of a first single device execution task of the plurality of single device execution tasks to a first device from the plurality of target network devices while establishing a communication channel with a second device from the plurality of target network devices,
    wherein the communication channel is for providing a second single device execution task of the plurality of single device execution tasks.

9. The method of claim 1, wherein providing each of the plurality of single device execution tasks includes:
    halting providing of a first single device execution task to a first device of the plurality of target network devices if at least one other of the plurality of single device execution tasks is not yet ready for providing; and dispatching, at substantially same time, the plurality of single device execution tasks to the plurality of target network devices for synchronous execution of the plurality of single device execution tasks on the plurality of target network devices.

10. A method comprising:
obtaining a command to be executed on a plurality of target network devices, wherein the command includes a marker indicating that execution is to be synchronized among the plurality of target network devices;
splitting the command into a plurality of single device execution tasks, each for a respective network device of the plurality of target network devices;
providing each of the plurality of single device execution tasks, via a command line interface or an application programming interface, to a respective one of the plurality of target network devices, the plurality of single device execution tasks being provided within a bounded time interval; and
storing the plurality of single device execution tasks into a plurality of device queues such that each of the plurality of device queues is dedicated to a respective network device from the plurality of target network devices.

11. The method of claim 10, wherein the plurality of single device execution tasks are placed at an end of the plurality of device queues, and further comprising:
based on detecting that a first single device execution task from the plurality of single device execution tasks reached a front of a first device queue among the plurality of device queues, halting providing, to a first network device from the plurality of target network devices, the first single device execution task until remaining ones of the plurality of single device execution tasks reach a front of remaining ones of the plurality of device queues.

12. The method of claim 10, wherein providing each of the plurality of single device execution tasks includes:
substantially simultaneously dispatching the plurality of single device execution tasks to the plurality of target network devices for synchronous execution of the plurality of single device execution tasks on the plurality of target network devices.

13. An apparatus comprising:
a memory;
a network interface configured to enable network communications; and
a processor, wherein the processor is configured to perform operations comprising:
obtaining a command to be executed on a plurality of target network devices, wherein the command includes a synchronization strategy indicating whether the command is to be executed within a bounded time interval on the plurality of target network devices;
splitting the command into a plurality of single device execution tasks, each for a respective network device of the plurality of target network devices; and
providing each of the plurality of single device execution tasks, via a command line interface or an application programming interface, to a respective one of the plurality of target network devices, the plurality of single device execution tasks being provided within the bounded time interval.

14. The apparatus of claim 13, wherein the processor is further configured to perform an additional operation comprising:
establishing a communication channel to each of the plurality of target network devices, at least one communication channel is established using a different protocol than used on another communication channel.

15. The apparatus of claim 14, wherein the processor is further configured to perform another additional operation comprising:
halting providing one of the plurality of single device execution tasks until the communication channel is established with each of the plurality of target network devices.

16. The apparatus of claim 13, wherein the command includes a plurality of parameters that are to be collected by the plurality of target network devices, and the processor is further configured to perform an additional operation comprising:
obtaining the plurality of parameters that are output by the plurality of target network devices, the plurality of parameters being generated by the plurality of target network devices performing the plurality of single device execution tasks substantially simultaneously.

17. The apparatus of claim 13, wherein the processor is configured to perform obtaining the command to be executed on the plurality of target network devices by:
obtaining, from a client device, a request comprising a list of the plurality of target network devices that are to execute the command and an execution timeout that defines the bounded time interval.

18. The apparatus of claim 13, wherein the synchronization strategy is a marker indicating that execution is to be synchronized among the plurality of target network devices, and the processor is further configured to perform an additional operation comprising:
storing the plurality of single device execution tasks into a plurality of device queues such that each of the plurality of device queues is dedicated to a respective network device from the plurality of target network devices.

19. The apparatus of claim 18, wherein the plurality of single device execution tasks are placed at an end of the plurality of device queues, and the processor is further configured to perform an additional operation comprising:
based on detecting that a first single device execution task from the plurality of single device execution tasks reached a front of a first device queue among the plurality of device queues, halting providing, to a first network device from the plurality of target network devices, the first single device execution task until remaining ones of the plurality of single device execution tasks reach a front of remaining ones of the plurality of device queues.

20. The apparatus of claim 13, wherein the processor is further configured to perform additional operations comprising:
halting providing of a first single device execution task of the plurality of single device execution tasks to a first device from the plurality of target network devices while establishing a communication channel with a second device from the plurality of target network devices,
wherein the communication channel is for providing a second single device execution task of the plurality of single device execution tasks.

* * * * *